United States Patent [19]

Lamprey

[11] Patent Number: 4,934,970
[45] Date of Patent: Jun. 19, 1990

[54] THRUST-DRAG INSTRUMENTATION FOR POWER BOAT

[76] Inventor: Donald F. Lamprey, 4909 Ledyard Dr., Manlius, N.Y. 13104

[21] Appl. No.: 237,434

[22] Filed: Aug. 29, 1988

[51] Int. Cl.$^5$ ............................................. B60L 1/14
[52] U.S. Cl. ..................................... 440/2; 73/862.29; 73/862.49
[58] Field of Search ..................... 440/1, 2, 61, 900; 248/642; 73/862.29, 862.49

[56] References Cited

U.S. PATENT DOCUMENTS

| | | |
|---|---|---|
| 2,517,038 | 8/1950 | Sheffield . |
| 2,641,926 | 6/1953 | Eisenbart . |
| 2,681,565 | 6/1954 | Kelk . |
| 4,605,375 | 8/1986 | Ferguson . |

*Primary Examiner*—Joseph F. Peters, Jr.
*Assistant Examiner*—Jesús D. Sotelo
*Attorney, Agent, or Firm*—Wall and Roehrig

[57] ABSTRACT

A propeller driven propulsion unit is pivotably mounted upon the transom of a boat. A fluid operated cylinder having an extendable shaft is mounted between the propulsion unit and the transom so that at least a portion of the thrust developed by the propeller is transmitted back to the boat through the cylinder. Accordingly, changes in propeller thrust produce changes in the fluid pressure acting on the cylinder. A pump provides fluid to the cylinder to either extend or retract the shaft to adjust the position of the unit. The pressure of the fluid in the cylinder is measured by a guage which is calibrated to convert pressure readings into thrust readings. This thrust information is used by the boat operator to adjust the boat trim or make other adjustment that provide for more efficient and safer boat operations.

3 Claims, 1 Drawing Sheet

THRUST-DRAG INSTRUMENTATION FOR POWER BOAT

BACKGROUND OF THE INVENTION

This invention relates to a marine propulsion system and, in particular, to apparatus for providing the operator of a boat with certain continuous data regarding the drag on the hull of the boat as it is being propelled through the water by a transom mounted propulsion unit.

In U.S. Pat. No. 4,605,375 to Ferguson, there is described a typical stern mounted propulsion unit for a boat having a trim feature for adjusting the position of the propulsion unit to provide for more effective propeller thrust angles for existing running condition Running conditions can be effected by many things such as distribution of the boat load, water conditions and the angle of attack that the boat hull presents to the water, power settings and propeller pitch The Ferguson unit contains a pair of hydraulically operated cylinders that are used to move the propulsion unit through a full range of trim positions. In addition, to the trim positions the cylinders can move the propulsion unit beyond the full-up trim position into a tilt position to protect the propeller from rocks and other objects when the boat is in shallow water or being trailered. Movement of the cylinders is controlled by means of an electrical system which regulates the operation of a pump for delivering hydraulic fluid to the cylinders. A pressure actuated switch is contained in the hydraulic system that is adapted to change status when the pressure in the fluids exceed a predetermined level. The cylinders are mounted on the boat so that changes in thrust will produce corresponding changes in the hydraulic fluid pressure. The pressure sensitive switch is set so that it will change status when the thrust exceeds a certain limit. This in turn prevents the propulsion unit from being moved from the trim configuration into the tilt configuration when the propeller is turning at high speed.

In most boat trim systems having one or more hydraulic cylinders for selectively adjusting the angular position of a propulsion unit, the boat operator has no way of judging when the boat is properly trimmed for the existing running conditions. Boat operators have heretofore been forced to rely upon their own instincts when trimming or adjusting the condition of the boat. Only the most experienced and skilled operators, however, can judge with any great accuracy when the boat is properly adjusted for existing running conditions. An improperly trimmed boat operating under adverse running conditions, can be unstable and pose a danger to those on board. An improperly throttled or trimmed boat will consume excessive amounts of fuel.

SUMMARY OF THE INVENTION

It is therefore a primary object of the present invention to improve apparatus for properly adjusting the positioning of a stern mounted marine propulsion unit.

A further object of the present invention is to provide accurate thrust information to a boat operator that can be used by the operator to set the boat speed, adjust the boat load or trim the boat to meet changing running conditions or in the case of a multi-engine craft to balance the thrust of the engines.

A further object of the present invention is to promote boating safety by providing for more efficient boat operations.

These and other objects of the present invention are attained by means of a power driven boat having a stern mounted propeller driven propulsion unit, a bracket for pivotally mounting the propulsion unit upon the transom of the boat so that the position of the propeller can be adjusted, at least one fluid actuated power cylinder having an extendable arm that is positioned between the propulsion system and the boat transom so that at least part of the thrust developed by the propeller is transmitted through the cylinder to the hull, a pump connected to the power cylinder by means of a fluid line, a control unit for selectively operating the pump to extend and retract the arm of the power cylinder, and a pressure gauge mounted in the fluid line that is calibrated to convert the pressure measurements to thrust readings whereby the position of the propeller can be adjusted to trim the boat for more efficient operation.

BRIEF DESCRIPTION OF THE DRAWINGS

For a better understanding of these and other objects of the present invention reference is made to the following detailed description and of the invention that is to be read in conjunction with the accompanying drawings, wherein.

DETAILED DESCRIPTION OF THE PREFERRED EMBODIMENT

Figure 1:
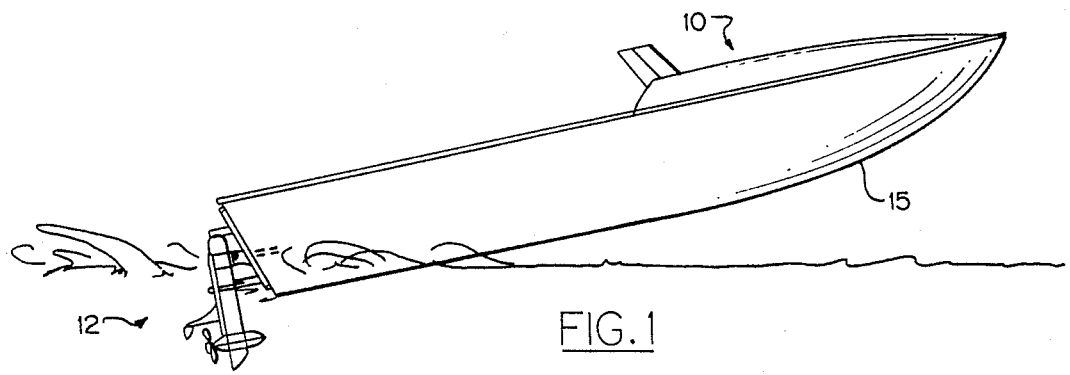
FIG. 1 is a side elevation showing a boat equipped with a stern mounted propulsion unit embodying the teachings of the present inventions.

Referring now to the drawings, a power boat 10 is shown in FIG. 1 moving through a body of water at a relatively high speed. The boat is equipped with a stern drive propulsion unit, generally referenced 12, which is sometimes referred to as an inboard-outboard motor. As will be explained in greater detail below, the propulsion unit typically includes one or more hydraulically actuated power cylinders for raising and lowering the unit whereby the hull of the boat can be trimmed as it moves through the water. Typically, the operation of the power cylinder or cylinders is controlled manually by the boat operator through the use of a three-position trim switch. The switch is normally biased in a neutral or off position from which it can be selectively moved to either an up or down position to change the attitude of the propulsion unit and thus the boat's attitude in the water.

Figure 2:
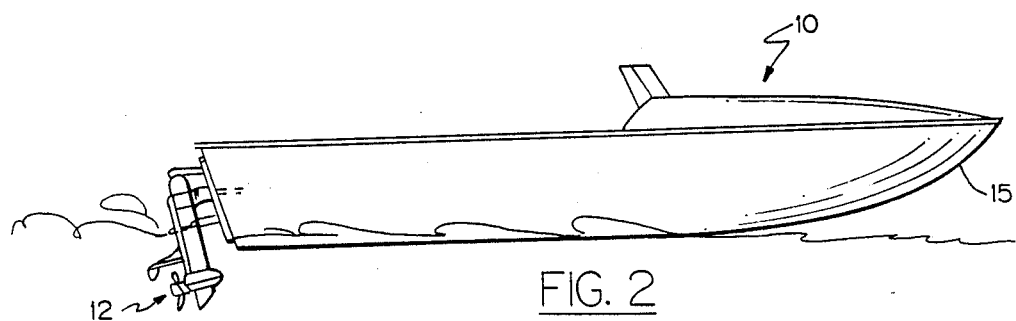
FIG. 2 is a view similar to that shown in FIG. 1 wherein the boat has been trimmed using the apparatus of the invention to provide for safer and more efficient operation of the boat.

The boat illustrated in FIG. 1 is shown planing high out of the water. As a consequence, the hull presents a high angle of attack to the water and thus generates considerable drag. This, in turn, retards the forward motion of the boat and forces the propulsion system to work harder. Under certain running conditions, the high attitude of the boat can create unstable and thus unsafe operating conditions. By moving the trim switch to a down position the propeller will be moved deeper into the water which forces the nose of the boat down as shown in FIG. 2. This reduces the angle of attack of the hull against the water and permits the boat to plane more easily through the water increasing the effectiveness of the propulsion system.

As pointed out in the previously noted Ferguson Patent, the operator of a power boat equipped with a trim control of this type has no accurate method of determining exactly when the craft is properly trimmed. The operator, therefore, must rely on his or her skills when adjusting the up-down position of the propeller. Oftentimes, the operators "feel" for an optimum trim position is incorrect and there is no means available by which this error can be detected and corrected. The apparatus of the present invention is specifically dedicated to providing a boat operator a calibrated thrust reading that is valid for all power settings and which provides information that can be used in setting the trim of the boat. In addition, the thrust readings can be used as an aid in selecting the proper propeller pitch, adjusting auxiliary trim tabs, and distributing boat loads and making necessary power adjustments particularly in multi-engine crafts.

Figure 3:
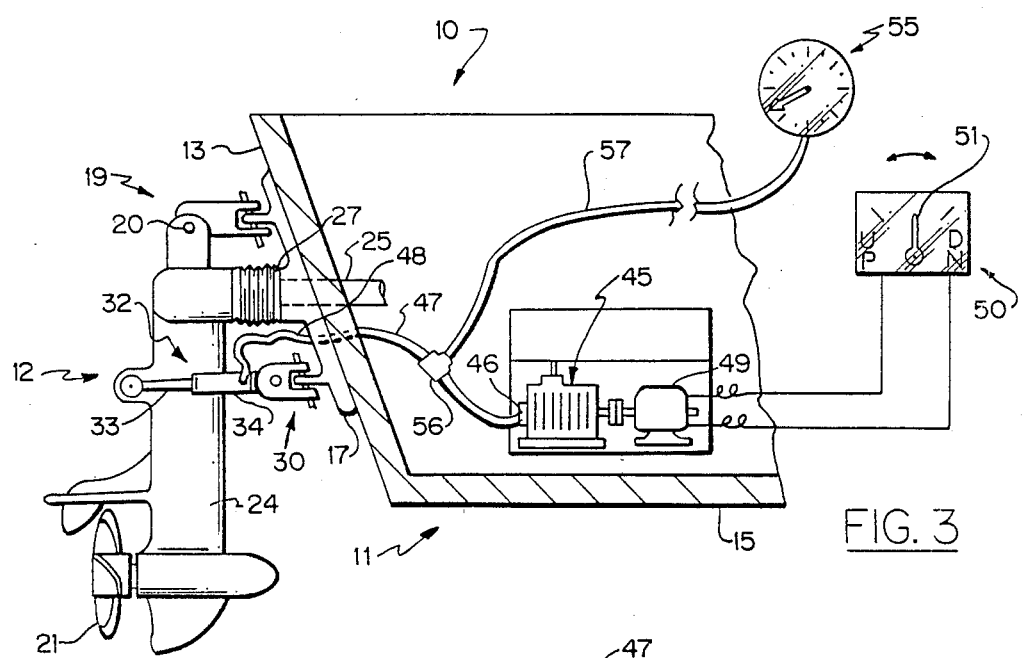
FIG. 3 is a partial side elevation showing in section the stern section of a power boat and a marine propulsion unit incorporating the teachings of the present invention.

For instance, two power systems of the type shown in FIG. 3 could be mounted on the transom of a boat. By adjusting the trim setting of each power unit to minimize its thrust (and thrust of the adjacent unit) the most efficient operating regimen for the boat will be established. Also, load distribution and power settings of each unit can be optimized by minimizing the thrust readings for each power unit.

Turning now to FIG. 3, there shown is the aft section 11 of a power boat 10 that is equipped with an inboard-outboard propulsion unit 12. The unit is mounted upon the transom 13 of the hull 15 by means of a mounting bracket 17. The bracket is affixed to the transom by any suitable means and the propulsion unit is suspended from an upper swivel assembly 19 by means of a horizontally aligned pivot 20. The entire propulsion unit can thus rotate about the horizontally aligned pivot to adjust the position of the propeller 21 located in the lower part of propulsion unit housing 24. By changing the angular relationship of the propeller relative to the hull, the boat can be trimmed to minimize hull drag. A drive shaft 25 is attached to an inboard motor (not shown), and is coupled to the propulsion unit through a flexible connector within protective boot 27 in a manner well known and used in the art.

Trimming of the boat hull is achieved by positioning the propulsion unit at any desired setting within a range of positions that fall between a full down position and a full up position which typically provides about 15 degrees of displacement for the propeller about the pivot 20. This trimming changes the angle of thrust of the propeller in the water and thus correspondingly changes the angle of attack of the boat. By use of this trim feature, the most effective propeller thrust angle may be selected for various boat speeds, load conditions and the like.

Figure 4:
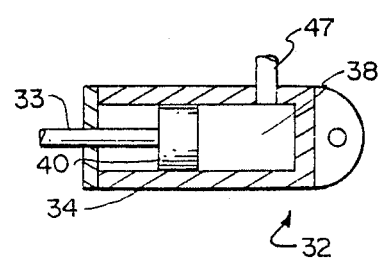
FIG. 4 is a partial enlarged side elevation in section showing a power cylinder used to adjust the position of the propulsion unit shown in FIG. 3.

A power cylinder 32 is secured in the bracket below pivot 20 by means of a second swivel assembly 30 so that the cylinder can swing with the propulsion unit housing. The power cylinder includes an extendable shaft 33 that is pinned to the back of the propulsion unit housing. The shaft can be extended or retracted in the cylinder housing 34 to move the propulsion unit through the full range of trim positions. With further reference to FIG. 4, the power cylinder housing 34 contains an internal chamber 38 which encloses a piston 40. The piston 40 is attached to the extendable shaft 33 and is adapted to move the shaft between a fully extended and a fully retracted position. Hydraulic fluid is passed into the chamber behind the piston from a reversible pump 45 mounted in the hull 15 of the boat. The discharge end of the pump 46 is connected to the power cylinder by a fluid line 47, the terminal end 48 of which is flexible enough to allow the propulsion unit to move freely in either a horizontal or a vertical direction.

An electrically actuated reversible motor 49 is used to drive the pump 45 and thus controls the activity of the power cylinder. A control panel 50 is mounted in the cockpit of the boat in easy reach of the operator. The panel contains a three-position trim switch having an actuator arm 51 that is normally biased into an off or neutral position wherein the motor 49 is held inoperative. Moving the arm in a clockwise direction as viewed in FIG. 3 turns the pump in one direction thereby causing the power cylinder to move the propulsion unit in a direction so as to push the bow of the boat down. Turning the arm in a counterclockwise direction will reverse the direction of the pump thus affecting movement of the cylinder so as to raise the bow of the boat. The trim switch allows the operator to selectively move the motor through a full range of trim positions.

A pressure sensing gauge 55 (FIG. 3) is mounted in the boat cockpit in easy view of the operator. The gauge is connected at 56 into the fluid line 47 by means of a second line 57. The gauge is arranged to continually monitor the pressure of the fluid. Because the power cylinder is arranged to act between the propulsion unit and the boat transom, at least a portion of the thrust developed by the propeller is transmitted through the power cylinder to the boat hull. The pressure within the fluid system therefore can be used as a means for sensing the actual thrust delivered by the propeller 21. In the operation of the present invention, the pressure gauge 55 is calibrated to provide a reading indicative of the actual thrust delivered by the propulsion unit. This of course provides instantaneous and valuable information to the boat operator that can be used to adjust the boat trim for existing running conditions. In practice, the boat operator adjusts the trim position for a given power setting so that minimum thrust is exerted by the engine thereby insuring that optimum running conditions are maintained for that setting. This thrust information can also be used to more evenly distribute the load carried by the boat, balance multi-engine propulsion systems, set auxiliary trim tabs and even set the speed and pitch of the propeller.

While the invention has been described in detail with respect to a single preferred embodiment, it should be understood that the invention is not limited to that embodiment, and that many modifications and variations will present themselves to those of skill in the art without departing from the scope and spirit of this invention, as defined in the appended claims. It should additionally be understood that, while the preceeding illustration and description are for an improvement to an inboard/outboard mounted propulsion unit, that same shall apply to an outboard mounted propulsion unit equipped with a means to change the relationship of the propeller to the hull by means of hydraulically actuated power piston or pistons.

What is claimed is:

1. A method of trimming a power boat as it moves through the water that includes the steps of:
   movably mounting a propeller driven propulsion unit upon a transom of a power boat,
   mounting at least one fluid actuated power cylinder having an extendable shaft between the transom and the propulsion unit so that the position of the propulsion unit changes as the shaft is moved between an extended position and a retracted position to vary the boat trim,
   applying fluid under pressure from a hydraulic supply means to the cylinder so that the fluid pressure in the supply means varies over a given range of pressures in response to changes in the thrust delivered by the propulsion unit,
   connecting said supply means to a sensing means for detecting the pressure in said supply means within said given range of pressures and converting the sensed pressures to thrust readings within said given range,
   maintaining the propulsion unit power setting at a fixed setting, and
   adjusting the position of the propulsion unit to produce a minimum thrust reading for said fixed power setting.

2. The method of claim 1 that further includes suspending the propulsion unit from a horizontally disposed swivel means.

3. The method of claim 1 that includes movably mounting a plurality of propeller driven propulsion units upon the transom of a boat and includes the further step of balancing the thrust delivered by each unit.

* * * * *